UNITED STATES PATENT OFFICE.

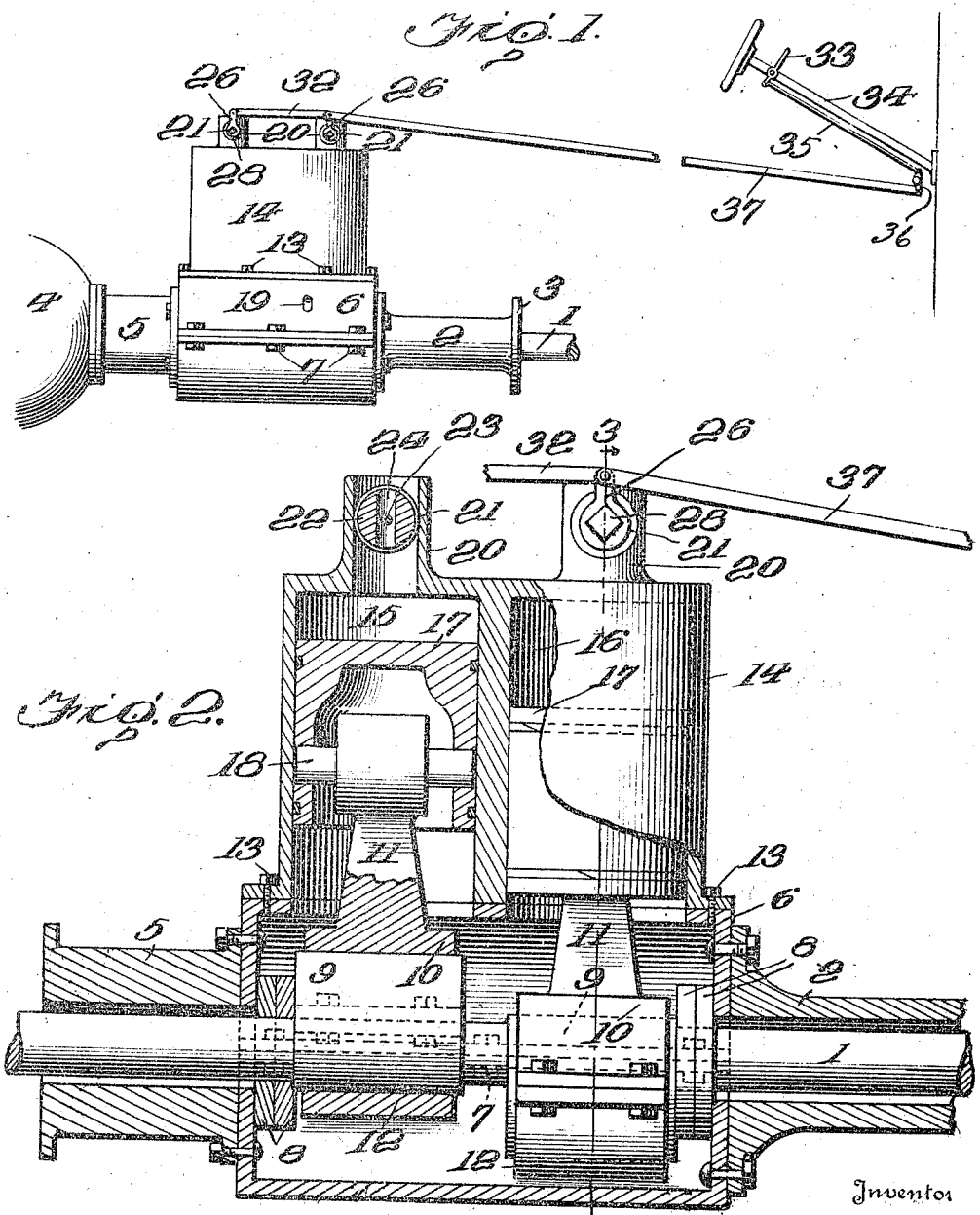

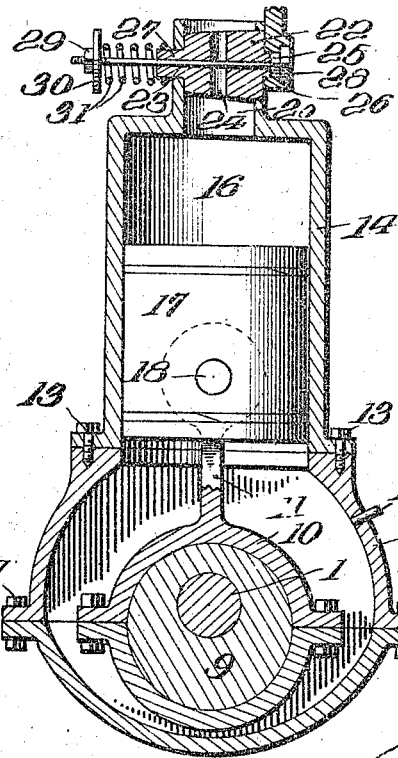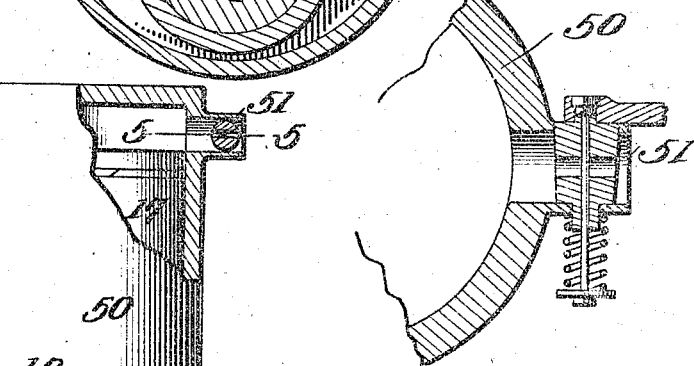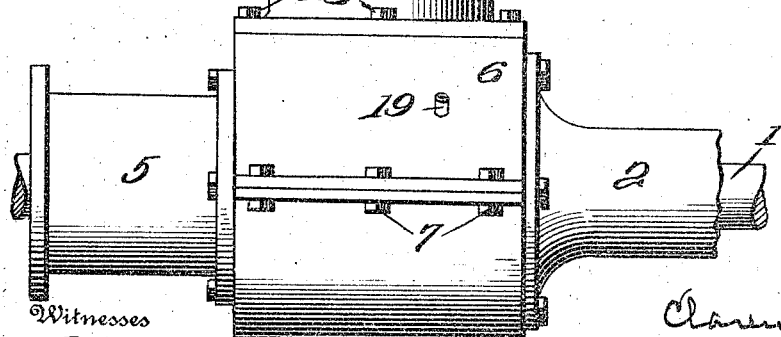

CLARENCE HULBERT, OF AUBURN, NEW YORK, ASSIGNOR OF ONE-FOURTH TO PORTER BEARDSLEY AND ONE-FOURTH TO ERWIN C. SOPER, BOTH OF AUBURN, NEW YORK.

BRAKE DEVICE FOR MOTOR-VEHICLES.

1,254,228.

Specification of Letters Patent. Patented Jan. 22, 1918.

Application filed July 27, 1916. Serial No. 111,740.

*To all whom it may concern:*

Be it known that I, CLARENCE HULBERT, a citizen of the United States, residing at Auburn, in the county of Cayuga and State of New York, have invented certain new and useful Improvements in Brake Devices for Motor-Vehicles; and I do hereby declare the following to be a full, clear, and exact description of the invention, such as will enable others skilled in the art to which it appertains to make and use the same.

My invention consists in the novel features hereinafter described, reference being had to the accompanying drawings, in which I have shown two embodiments of my invention selected by me for purposes of illustration, and the said invention is fully disclosed in the following description and claims.

Referring to the drawings;

Figure 1 is a side view of my improved brake mechanism as used with a motor vehicle.

Fig. 2 is an enlarged view of the same partly in vertical section for illustrating the interior of the same.

Fig. 3 is a transverse vertical sectional view taken on line 3—3 of Fig. 2.

Fig. 4 is a modification showing a single cylinder brake device.

Fig. 5 is a horizontal sectional view taken on line 5—5 of Fig. 4.

The object of my invention is to provide an improved brake for the propeller shaft of a motor vehicle, adapted to be placed between the engine and differential, and controlled by a lever or the like, placed on the steering post of the vehicle.

A further object is to provide a device of this character, which is in the nature of an attachment and which may be applied to machines now in use, and which is constructed of separable parts, so that the same may be taken apart for the purposes of cleaning or repairing.

A still further object is to provide a brake device, which will be effectually lubricated by the working of the brake pistons on the drive shaft.

With the foregoing objects outlined, and with other objects in view, as will be apparent as the nature of the invention is better understood, the present invention resides in the combination and arrangement of parts, and in the details of construction set forth it being understood that changes in the precise embodiment of the invention can be made within the scope of the appended claims, without departing from the spirit of the invention or sacrificing any of its advantages.

Before proceeding with a more detailed description, it may be stated that in the form of my improvement herein shown, I employ a vehicle of ordinary form, special means being employed for mounting my brake mechanism in convenient position upon a suitable part of the vehicle, other special means being employed for connecting the brake with the propeller shaft, whereby whenever the propeller shaft is rotated, it will draw in and force out air in the brake cylinders. The construction or organization of the other parts of the vehicle, does not require alterations or change in any way, except to remove the propeller shaft casing between the transmission and differential and substitute my improved mechanism in lieu thereof.

In the drawings, 1 designates the propeller shaft of a motor vehicle and 2 represents a short casing which surrounds a portion of the shaft and has a flanged end 3 adapted to be secured to the transmission casing (not shown) by any suitable means. Secured to the differential casing 4 by any desired means, is another short casing 5, and these casings 2 and 5 support and are bolted to a two-part brake crank case 6, which is split longitudinally and joined by the bolts 7. Mounted on the shaft 1 and located at each end of the crank case 6, are pairs of bearing rings 8, one of which is steel and the other bronze, and these rings while forming bearings, also prevent the lubricant which is placed in the crank case, from escaping. A pair of oppositely disposed eccentric cams 9, are mounted on the shaft within the crank case, and the forked lower ends 10 of connecting rods 11, are secured to said cams by half collars 12.

Secured to the upper portion of the crank case by means of screws 13, is a cylinder block 14, having cylinders 15 and 16, and mounted in each of the cylinders is a piston 17, which is connected to the upper end of its respective connecting rod by a pin 18. From the foregoing it will be apparent that each time the propeller shaft turns, it will move one of the pistons upwardly in its cylinder and the other piston downwardly in its cylinder, and as oil is placed in the crank case through a breather 19, each time the cams turn they will splash the oil and effectively lubricate the pistons, cylinders and cams.

The upper end of each of the cylinders is provided with an air passage 20, in which is located a rotating valve 21, which consists of a tapered valve barrel 22, suitably seated in the air passage, and having a longitudinal bore 23, and a transverse air duct 24. The enlarged end of the valve barrel is provided with an angular stud 25 upon which is rigidly mounted, a thick arm 26 and the smaller end of the barrel has an annular stud 27 which is rotatably mounted in an aperture in the air passage. A bolt 28 has its head countersunk in the arm 26, passes through the bore 23 and projects beyond the end of the stud 27. Mounted on the outer end of the bolt 28 is an adjustable nut 29, and a washer 30 and located between said washer and air passage wall, and surrounding the bolt 28, is a coil spring 31 which acts to maintain said valve barrel in its mounting.

The arms 26 of the valves are connected for joint movement by a link 32, and said valves are adapted to normally remain open. The valves 21 are operated by a hand lever 33, pivotally mounted on the steering post 34, of the motor vehicle, and this lever is pivotally connected to the upper end of a link 35 which has its lower end pivotally connected to the upper arm of a rocking lever 36, and the lower arm of the lever 36 is pivotally connected to the forward end of a reciprocating rod 37, which has its rear end pivotally connected to the forward one of the arms 26.

When it is desired to slowly stop the propeller shaft and halt the vehicle, the valves are gradually closed and as the passages 24 are approaching their horizontal position, they will restrict the passage of the air to and from the cylinders. In consequence the piston which is rising will be compelled to force the air in the upper end of its cylinder through an increasingly restricted opening while the piston which is descending will draw air into its cylinder through a similarly increasingly restricted opening. This has a tendency to halt the shaft and will continue until the valves are entirely closed when the pistons will be working against cushions of air that will gradually stop the rotation of the shaft.

On the other hand, when it is desired to stop the shaft quickly, the valves are speedily closed and this is to be desired in case of great emergency. The effect on the occupants in this instance, will be no greater than would occur when the motor was stalled and the vehicle slides on its wheels.

In the modification shown in Figs. 4 and 5, but one brake cylinder 50 is employed and the valve 51 is located on the side of the cylinder instead of the top, and with this construction the operation is similar to the two cylinder construction.

What I claim and desire to secure by Letters Patent is:—

1. The combination with a rotatable shaft, of a plurality of stationary sleeves in which said shaft rotates, a casing supported by said sleeves, a cam mounted on said shaft within said casing, a cylinder carried by said casing and provided with a passage opening into the atmosphere, a piston mounted in said cylinder for drawing air into and forcing air out of said cylinder through said passage, a rod connecting the piston and cam, a normally opened valve mounted in said passage, and means for closing said valve.

2. The combination with a rotatable shaft, of a plurality of stationary spaced sleeves in which said shaft rotates, a casing located between and supported by said sleeves, a plurality of oppositely disposed cams fixed to said shaft, a cylinder block carried by said casing and having a plurality of bores, a passage placing each of said bores in communication with the atmosphere, a piston mounted in each of said bores for drawing air into and forcing air out of the bores through said passages, rods connecting the pistons and cams, a normally open valve located in each of said passages, and means for simultaneously closing said valves.

3. The combination with a rotatable shaft, of a plurality of spaced sleeves in which said shaft rotates, flanges provided on the adjacent ends of said sleeves, a longitudinally split two-part casing located between said sleeves and detachably secured to said flanges, detachable means for securing the two parts of the casing together, a plurality of oppositely disposed cams fixed to said shaft within said casing, packing rings mounted on the shaft between the cams and the ends of the casing, a cylinder block detachably secured to said casing and having a plurality of bores, a passage placing each of the bores in communication with the atmosphere, a piston mounted in each of said bores for drawing air into and forcing air out of the bores through said passages, rods connecting said pistons and cams, a normally open valve located in each of said passages, and means for simultaneously closing said valves.

4. The combination with a rotatable shaft, of a plurality of oppositely disposed cams fixed to said shaft, a plurality of cylinders stationarily mounted adjacent said shaft and each provided on its top with a single passage for conducting atmospheric air into and out of its respective cylinder, pistons mounted in said cylinders, rods connecting said pistons and said cams, a tapered valve barrel located in each of said passages, and provided with a longitudinal bore and a transverse air port, an angular extension provided upon the large end of each of said barrels, a control lever mounted upon each of said extensions and provided with a countersunk angular aperture, a bolt having an angular head resting in each of said apertures and extending through the barrel to a position beyond the opposite end of the same, a washer provided upon the outer end of each of said bolts, springs located between the washers and said passages for drawing the barrels into the passages, and a part connecting said levers for joint movement.

In testimony whereof I affix my signature.

CLARENCE HULBERT.